H. L. FRANKLIN.
Mop.
No. 208,165.                    Patented Sept. 17, 1878.
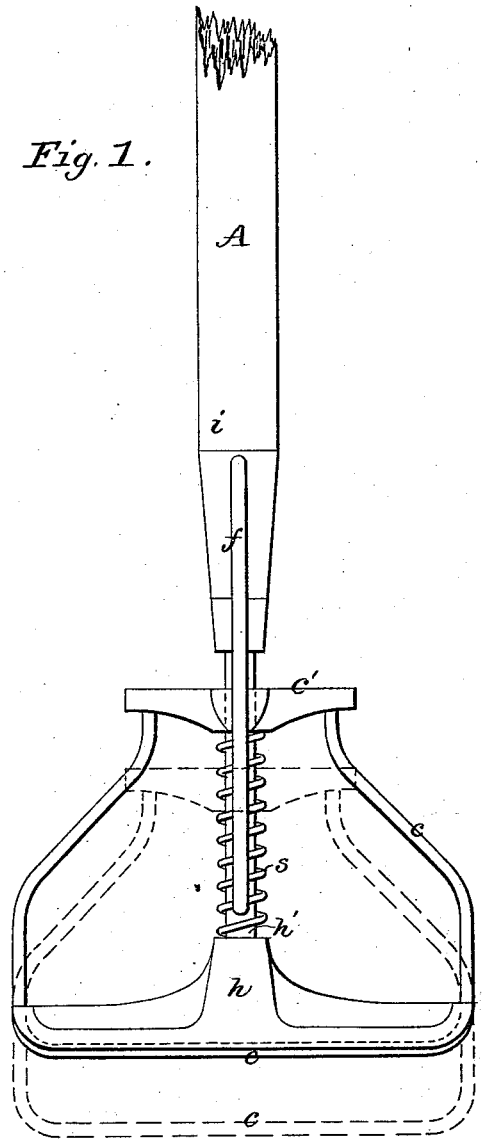
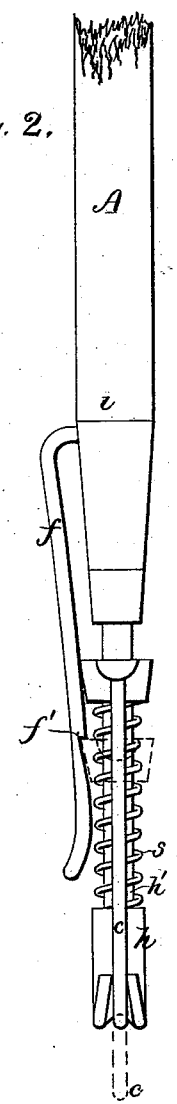
Witnesses —
Geo. W. Pierce
E. H. Glidden
Inventor —
H. L. Franklin
by Wright & Brown
Attys

UNITED STATES PATENT OFFICE.

HENRY L. FRANKLIN, OF BRATTLEBOROUGH, VERMONT, ASSIGNOR TO ELNATHAN WHITAKER AND ADDISON W. BARTLETT, OF SAME PLACE.

IMPROVEMENT IN MOPS.

Specification forming part of Letters Patent No. 208,165, dated September 17, 1878; application filed August 3, 1878.

*To all whom it may concern:*

Be it known that I, HENRY L. FRANKLIN, of Brattleborough, in the county of Windham and State of Vermont, have invented certain Improvements in Mop-Heads, of which the following is a specification:

This invention relates to that class of mop-heads consisting of a cross-head having a shank which is rigidly attached to a handle, a sliding bail or clamp, and a spring for forcing said bail or clamp against the cross-head, the mop-cloth being held between said cross-head and spring-impelled bail.

Heretofore it has been somewhat difficult to insert the cloth between the bail and cross-head, as well as to remove the cloth, on account of the pressure of the spring, which constantly forces the bail toward the cross-head with considerable power, so that the operator has to hold the bail away from the cross-head with one hand while inserting or removing the cloth with the other. Hence the operation is attended with some inconvenience and difficulty.

My invention has for its object to provide automatic means for holding the bail or clamp away from the cross-head while the mop-cloth is being inserted or removed; and to this end it consists in a catch or stop suitably secured to the mop-head, and adapted to engage automatically with the sliding bail and hold the same against the pressure of its spring when said bail is moved a sufficient distance away from the cross-head, as I will now proceed to describe.

Of the accompanying drawings, forming a part of this specification, Figure 1 represents a side view of a mop-head provided with my improvement. Fig. 2 represents an edge view of the same.

Similar letters of reference refer to like parts.

In the drawing, A represents a mop-head of the class above referred to, the same consisting of, first, a metallic cross-head or fixed clamp, $h$, having a shank, $h'$, which is rigidly secured to a handle, $i$; second, a bail or sliding clamp, $c$, composed of a bent rod or wire rigidly attached to a cross-bar, $c'$, which is adapted to slide on the shank $h'$; and, third, a spiral spring, $s$, on the shank $h'$, interposed between the cross-head $h$ and bar $c'$, and adapted to force the horizontal portion of the bail $c$ against the under side of the cross-head $h$. This mop-head is of the usual construction, and forms no part of my invention.

$f$ represents the catch or stop which constitutes my improvement. This device is preferably composed of a stout bent elastic wire or rod, attached at one end to the handle $i$, and extending down close by the shank $h'$ of the cross-head $h$, as shown, the rod being so arranged that its lower end will project below the cross-bar $c'$ of the bail $c$ when the latter is in its normal position, and will bear with a yielding pressure against said cross-bar. The rod is notched on its inner side near its lower end to form a shoulder, $f'$.

When a cloth is to be inserted between the cross-head $h$ and bail $c$ the operator presses downwardly with the foot or hand on the cross-bar $c'$. This operation separates the horizontal portion of the bail from the cross-head, and when the cross-bar has been moved below the shoulder $f$ the elasticity of the rod causes the shoulder to spring inwardly and bear against the upper surface of the cross-bar, as shown in dotted lines in Fig. 2, said shoulder forming a stop which prevents the spring $s$ from forcing the bail back against the cross-head. The operator, having both hands free, can then adjust the mop-cloth between the bail and cross-head, and then release the bail by springing the rod $f$ outwardly, thus allowing the bail to clamp the cloth against the cross-head.

This device is extremely simple, is automatic in its action, and can be applied to the mop-head without any alteration or adaptation of the latter, and by its use the inconvenience which has heretofore attended the insertion as well as the removal of mop-cloths is prevented.

I do not limit myself to the described construction and arrangement of the stop, as I regard any device which will accomplish the same purpose as falling within the scope of my invention. It is obvious that the stop may be attached to the cross-head, if desired, instead of the handle.

I claim as my invention—

1. In a mop-head, the sliding bail or clamp, impelled by a spring toward a fixed clamp or cross-head, combined with a catch or stop adapted to engage automatically with the sliding bail or clamp and hold the latter away from the fixed clamp, as set forth.

2. The combination of the elastic bent wire $f$ secured to the mop-handle, and provided with the shoulder or stop $f'$, with the spring-impelled sliding bail or clamp $c$, provided with the cross-bar $c'$, adapted to engage with the stop $f'$, as set forth.

In testimony whereof I have signed my name to this specification in the presence of two subscribing witnesses this 30th day of July, 1878.

HENRY L. FRANKLIN.

Witnesses:
F. A. CULLER,
WILLIAM S. NEWTON.